United States Patent [19]

Beck et al.

[11] 4,287,462

[45] Sep. 1, 1981

[54] VENEER LATHE CONTROL SYSTEM

[75] Inventors: Thomas L. Beck, Union Grove; Rick L. Tennessen, Racine, both of Wis.

[73] Assignee: Unico, Inc., Milwaukee, Wis.

[21] Appl. No.: 149,527

[22] Filed: May 13, 1980

[51] Int. Cl.³ .................... B27L 5/02; G05B 19/24
[52] U.S. Cl. ................................. 318/571; 318/603; 318/608; 144/209 R
[58] Field of Search ............... 318/603, 571, 602, 39, 318/608; 144/209 R, 209 A; 364/475

[56] References Cited

U.S. PATENT DOCUMENTS

| 3,244,206 | 4/1966 | Bossen | 144/209 R |
| 3,987,350 | 10/1976 | Pomella et al. | 318/571 |
| 4,197,888 | 4/1980 | McGee et al. | 144/209 A |
| 4,206,392 | 6/1980 | Shimajiri et al. | 318/571 X |

Primary Examiner—B. Dobeck
Attorney, Agent, or Firm—Quarles & Brady

[57] ABSTRACT

A control system for a veneer lathe feeds a knife into a rotating log to peel off a continuous sheet of veneer. When the knife is retracted, the orientation of the log is established and stored so that when the peeling operation is resumed, the knife motion is calculated to engage the log at the discontinuity in the log surface produced during retraction. In addition, when the knife engages the rotating log a compensation factor is momentarily added to the knife motion feed command to alleviate variations in veneer thickness caused by the mechanics of the lathe during impact. A considerable savings of veneer is obtained.

3 Claims, 17 Drawing Figures

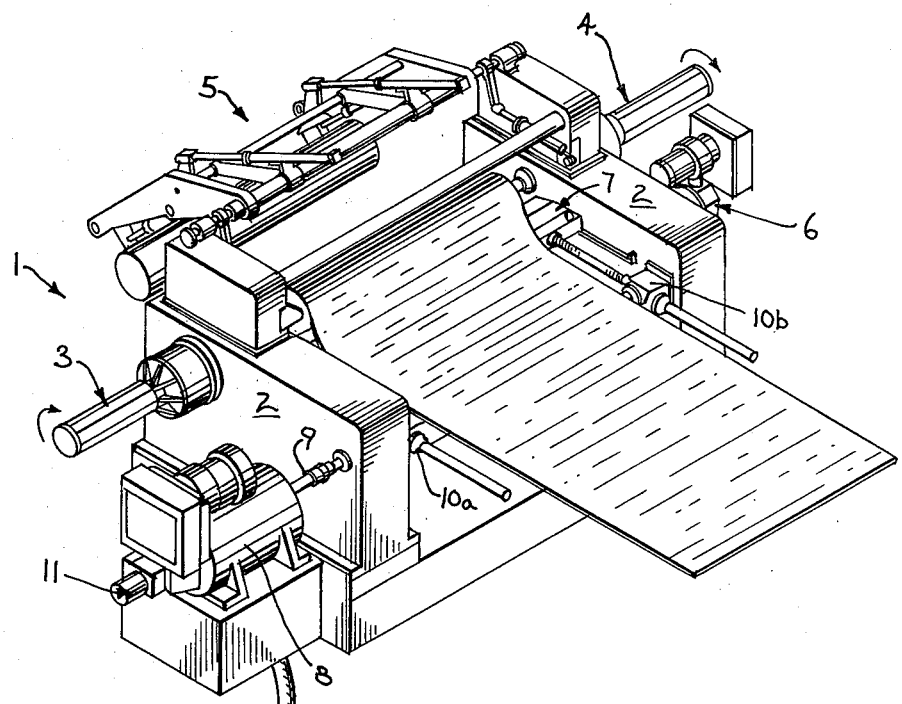
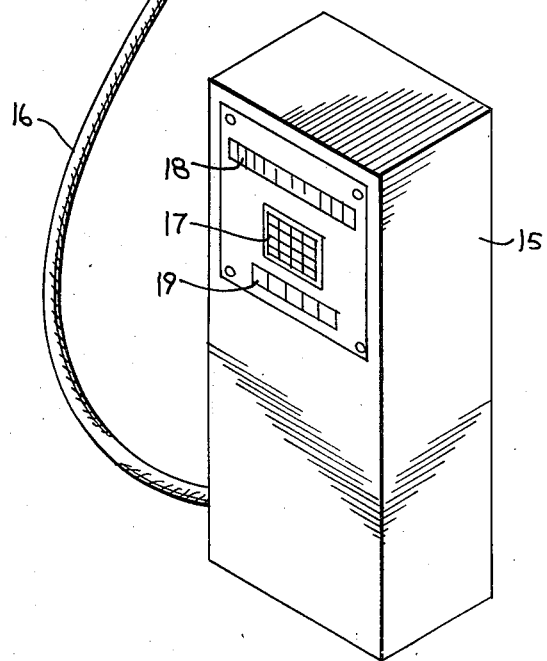
FIG. 1

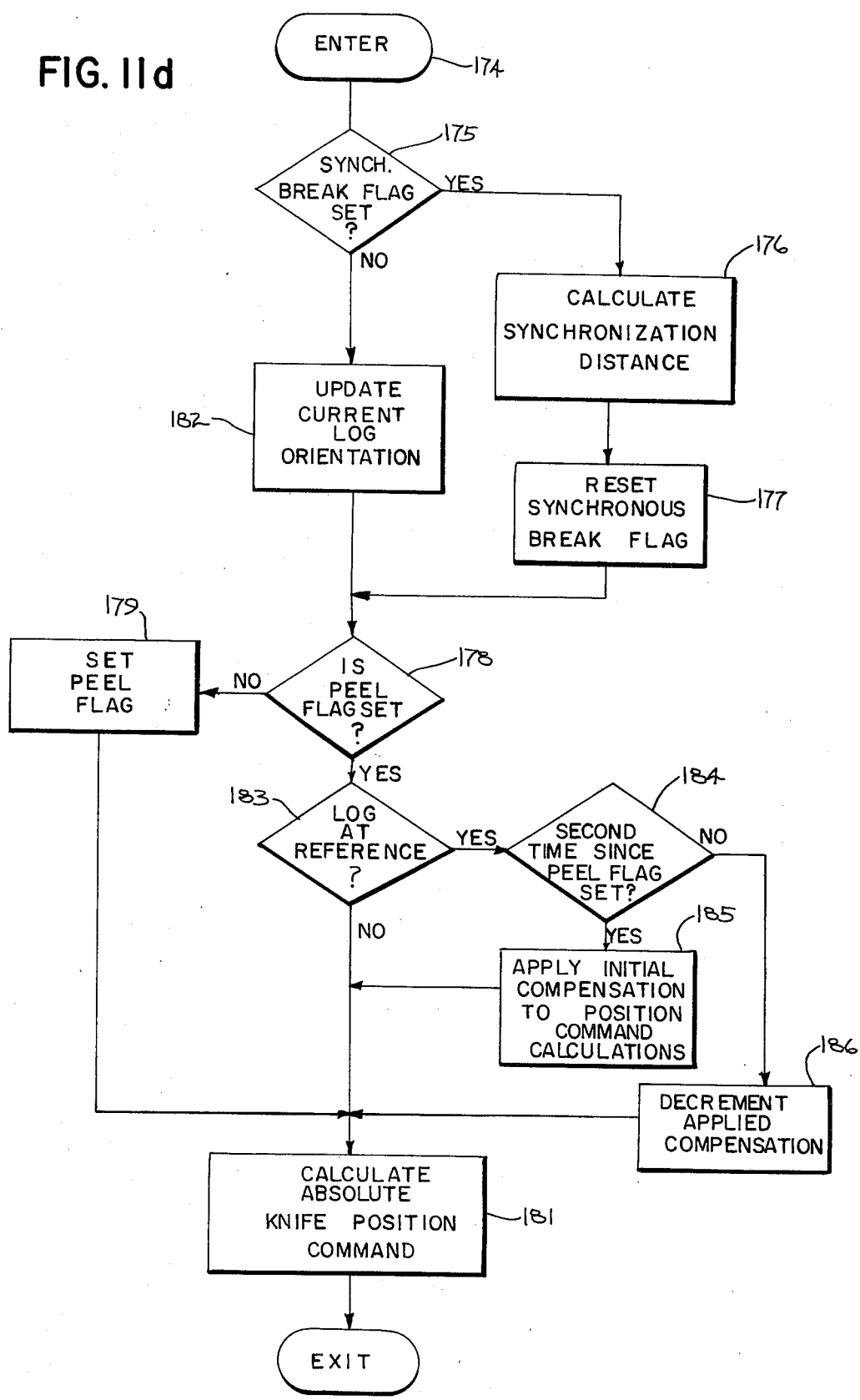

2 THICKNESSES

1+X THICKNESSES

1 THICKNESS

VENEER LATHE CONTROL SYSTEM

BACKGROUND OF THE INVENTION

The field of the invention is control systems, and particularly, systems for controlling the motion of rotary veneer lathes.

Rotary veneer lathes are used for the production of green veneer from wood logs. They include a charger mechanism which positions a log between a spindle and a tailpiece and a spindle drive which rotates the log at high speed. A knife which extends the length of the log is fed into engagement with the rotating log to first round the log and then to peel a continuous web, or veneer, which is discharged onto an adjacent tray mechanism. The knife is advanced until the log reaches a specified minimum diameter, at which point the knife is withdrawn and another log is loaded into position by the charger mechanism.

Prior systems for controlling rotary veneer lathes feed the knife into the log at a rate which is determined by the rotary speed of the log and the desired thickness of the veneer. Manual controls enable the operator to retract the knife momentarily when the log is fully rounded and good veneer starts to be produced so that the scrap pieces can be removed from the tray before good veneer is produced in quantity. Also, such a momentary manual retract is required when large logs are being cut and the tray mechanism is filled to capacity. In either case, when cutting is resumed the knife is merely fed into the log again at the feedrate required to provide the desired veneer thickness.

SUMMARY OF THE INVENTION

The present invention is an improved control system for a rotary veneer lathe which reduces waste by synchronizing knife motion with the rotary orientation of the log. More particularly, the present invention includes means for sensing the rotary orientation of the log, means for storing data indicative of the log orientation at the moment the knife is retracted from engagement with the log, and means responsive to an input signal and responsive to the stored log orientation data to feed the knife into engagement with the log at substantially the same point at which it previously disengaged the log.

A general object of the invention is to reduce the waste of material which results when the knife is retracted and then reengaged with the rotating log. When the knife is retracted a discontinuity is produced on the surface of the log. As a result, on prior systems when the knife is again fed forward to produce veneer, a discontinuity in veneer thickness is produced at some point during the first revolution of the log. With a log having a one foot diameter for example, this can result in three feet of wasted veneer each time the knife is retracted and reengaged. The control system of the present invention eliminates this wastage by synchronizing the knife motion to reengage the log at the discontinuity. Consequently, the discontinuity in veneer thickness is always located at the beginning of the web of material.

Another object of the invention is to control knife motion of eliminate variations in veneer thickness which otherwise occur due to mechanical forces generated when the knife engages the log. The forces suddenly generated when the knife first engages the log stress the lathe supporting structure and cause the veneer thickness to vary. The dynamics of the lathe are predictable however, and the control system of the present invention varies the feed rate of the knife during this transient period to compensate for the variations of veneer thickness which otherwise occur.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIG. 1 is a perspective view of a rotary veneer lathe and the attached control system of the present invention.

DESCRIPTION OF THE PREFERRED EMBODIMENT

Figure 2:
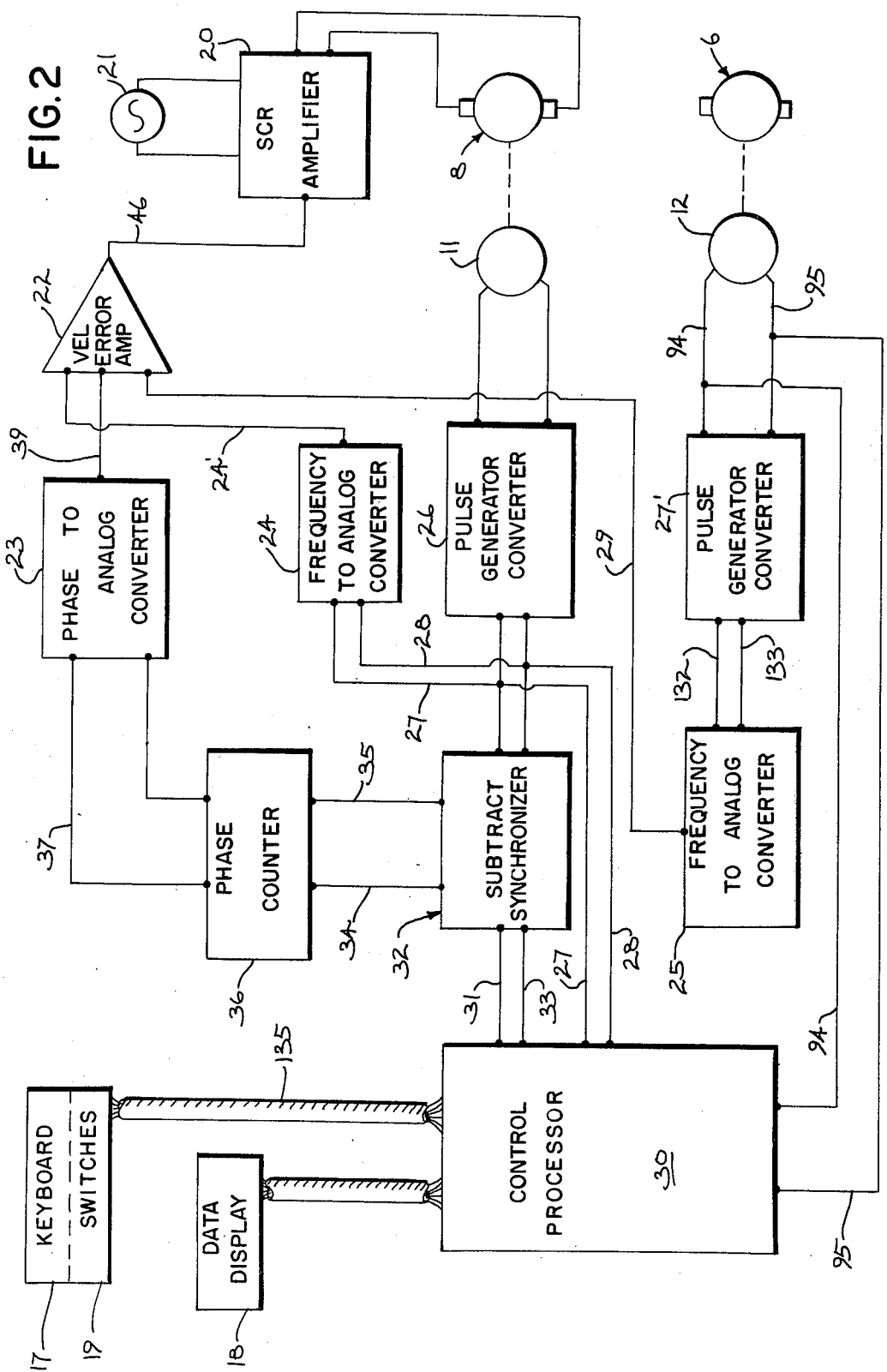
FIG. 2 is an electrical block diagram of the control system of FIG. 1.

Referring particularly to FIG. 1, a rotary veneer lathe 1 includes a frame 2 which supports a spindle comprised of a tailpiece 3 and a headstock 4. A charger mechanism 5 is supported by the frame, and when operated, it positions a log between the tailpiece 3 and the headstock 4. A spindle motor 6 rotates the log through mechanical linkages (not shown in the drawings) which couple it to the tailpiece 3 and headstock 4.

As the log is rotated, a knife 7 is fed forward into engagement with the log to peel a thin sheet of veneer from its surface. The knife 7 is driven by a knife motor 8 which is coupled through a shaft 9 to a pair of worm gears 10a and 10b. Rotation of the knife motor 8 in the forward direction feeds the knife 7 into engagement with the log and rotation of the knife motor 8 in the reverse direction retracts the knife 7.

The knife motor 8 is a low inertia, high torque d.c. motor designed for servomechanism application where fast response and high accuracy are required. A 50 hp, 1150 rpm wound field bidirectional motor is a typical motor suitable for this application, whereas the spindle motor 6 is a 200 hp, Lb 1150 rpm wound field bidirectional d.c. motor. A pulse generator 11 is mounted and coupled to the tail shaft of the knife motor 8 and a similar pulse generator 12 (not shown in FIG. 1) is mounted to the tail shaft of the spindle motor 6. Both pulse generators 11 and 12 are optical incremental pulse generators which produce two 90 degree phase-displaced square waves, the frequency of which is proportional to motor speed. The two phase-displaced square waves enable the direction of rotation of the motor to be determined and they provide a high resolution incremental position feedback signal.

Referring particularly to FIGS. 1 and 2, the veneer lathe control system is housed in a cabinet 15 and is connected to the lathe 1 through a cable 16. The control system includes a control panel which has a keyboard 17 through which the operator can enter manual data such as the desired veneer thickness. Also, it includes a twelve character display 18 and a set of switches 19 for selecting modes of operation. Under normal operation the control system drives a knife motor 8 to advance the knife 7 at a constant rate. This rate is determined by the spindle speed, as indicated by the spindle pulse generator, 12 and by the desired veneer thickness which is manually entered through the control panel. That is, the control system calculates a knife feed rate which will advance the knife a calculated distance for each revolution of the log to provide the desired veneer thickness. Spindle speed is not controlled, but instead, knife velocity is controlled to account for any variations or changes in spindle speed.

Referring particularly to FIG. 2, the knife motor 8 is driven by an SCR amplifier 20 which couples a three phase a.c. power source 21 to the motor armature windings to provide a three phase, halfwave, bidirectional power circuit. Appropriate gating of the SCR amplifier 20 permits four quadrant operation and it provides regenerative breaking by sending power back to the power lines during deceleration. A d.c. velocity error signal is applied to the SCR amplifier 20 by a velocity error amplifier 22. A ramp generator in the SCR amplifier 20 is responsive to this velocity error signal to control the firing of the silicon controlled rectifiers. When the velocity error signal is large, for example, the slope of the ramps are steep and the silicon controlled rectifier gates fire early each power line cycle to give long duration pulses of power to the knife drive motor 8. The polarity of the velocity error signal determines whether the ramp generator fires the three forward silicon controlled rectifier gates or the three reverse silicon controlled rectifier gates. Numerous SCR amplifier circuits are known to those skilled in the art and the particular type and size chosen is determined primarily by the particular knife motor 8 which is used.

The velocity error signal used to control the knife motor 8 is derived by combining a position error signal which is generated by a phase to analog converter circuit 23 with a knife velocity feedback signal which is generated by a frequency to analog converter 24. A spindle velocity feedback signal is also generated by a frequency to analog converter 25 and applied to the velocity error amplifier 22. The velocity feedback signals are derived from the quadrature signals generated by the respective pulse generators 11 and 12.

The quadrature feedback signals generated by the knife pulse generator 11 are first applied to a pulse generator converter circuit 26 which multiplies the pulse generator frequency by four and determines the direction of rotation. The resulting pulse train is generated on a forward feedback line 27 when the knife is moving into the log and the pulse train is generated on a retract feedback line 28 when the knife 7 is moving away from the log. The frequency to analog converter 24 employs this precision pulse train to generate a knife motor velocity feedback signal that is proportional to knife motor velocity. This analog signal is negative when the knife 7 is moving forward and it is positive when the knife 7 is being retracted. An identical pulse generator converter circuit 27' couples the spindle pulse generator 12 to the frequency to analog converter 25, and a resulting analog spindle velocity feedback signal is generated by the frequency to analog converter 25 and applied through a line 29 to the velocity error amplifier 22.

Referring particularly to FIG. 2, the positioning of the knife 7 is determined by position command pulses which are generated by a control processor 30. The control processor 30 receives the spindle motor feedback signals directly from the spindle pulse generator 12 and it receives data from the keyboard 17 and control panel switches 19 that indicate the mode of operation and the desired veneer thickness. As a result, during the peeling mode of operation forward command pulses are generated by the control processor 30 on a line 31 to a subtract synchronizer circuit 32, and during a retract mode of operation, position command pulses are generated to the subtract synchronizer 32 through a second line 33. The subtract synchronizer circuit 32 has a crystal controlled oscillator that supplies a 16 megahertz frequency to its two synchronizer channels. One synchronizer channel is fed the forward command pulses and the other channel is driven by the forward position feedback pulses from the pulse generator converter circuit 26. Each forward command pulse deletes one pulse from the 16 megahertz frequency applied to the one synchronizer channel and each forward position feedback pulse deletes one pulse from the 16 megahertz frequency applied to its other channel. The "modulated" pulse trains from the two synchronizer channels are applied through respective lines 34 and 35 to a phase counter circuit 36.

The phase counter circuit 36 combines the forward position command embodied in the pulse train generated on the line 34 with the forward position feedback signal embodied in the pulse train on the line 35. The result is a position error signal generated on a line 37 which is a 488 hertz square wave, the duty cycle of which is proportional to the difference between the commanded position of the knife 7 and the actual position of the knife 7. This is applied to the phase to analog converter circuit 23 which converts it to a positive analog signal for application to the velocity error amplifier 22.

Similarly, the subtract synchronizer 32 generates pulse trains on the lines 34 and 35 when reverse command pulses are received from the control processor 30 through the line 33. This occurs for example during a retract operation, in which case, reverse position feedback signals are received from the pulse generator converter 26 through the line 28. The phase counter circuit 36 receives the resulting synchronizer circuit outputs and generates a 488 hertz wave which is converted to a negative analog position error signal by the phase to analog converter circuit 23. This signal is applied through the line 39 to the velocity error amplifier 22.

Figure 4:
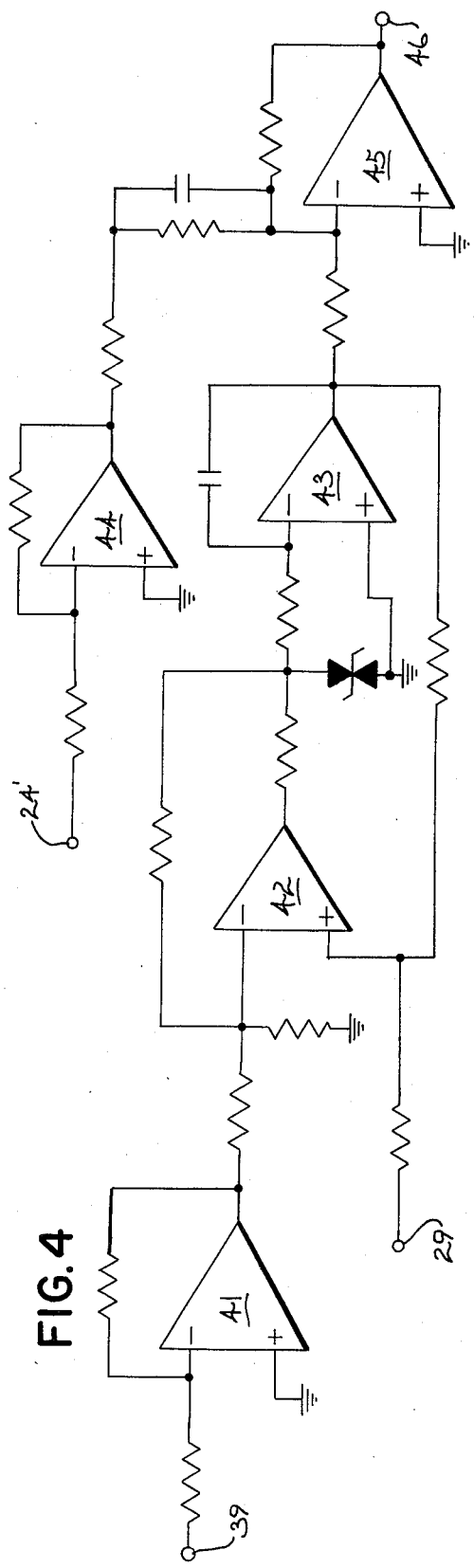
FIG. 4 is an electrical schematic diagram of the velocity error amplifier which forms part of the control system of FIG. 2.

Referring particularly to FIG. 4, the velocity error amplifier 22 is comprised of a network of operational amplifier 41, 42, 43, 44 and 45. The operational amplifiers 41–45 are interconnected in conventional manner to sum the analog position error signal applied through the line 39 with the log velocity, or spindle speed signal, applied through the line 29. The result is applied to the inverting input of the operational amplifier 45 along with a knife velocity signal received through the line 24'. The velocity error signal appears at the output of the operational amplifier 45 and is applied through a line 46 to the SCR amplifier 20.

Figure 5:
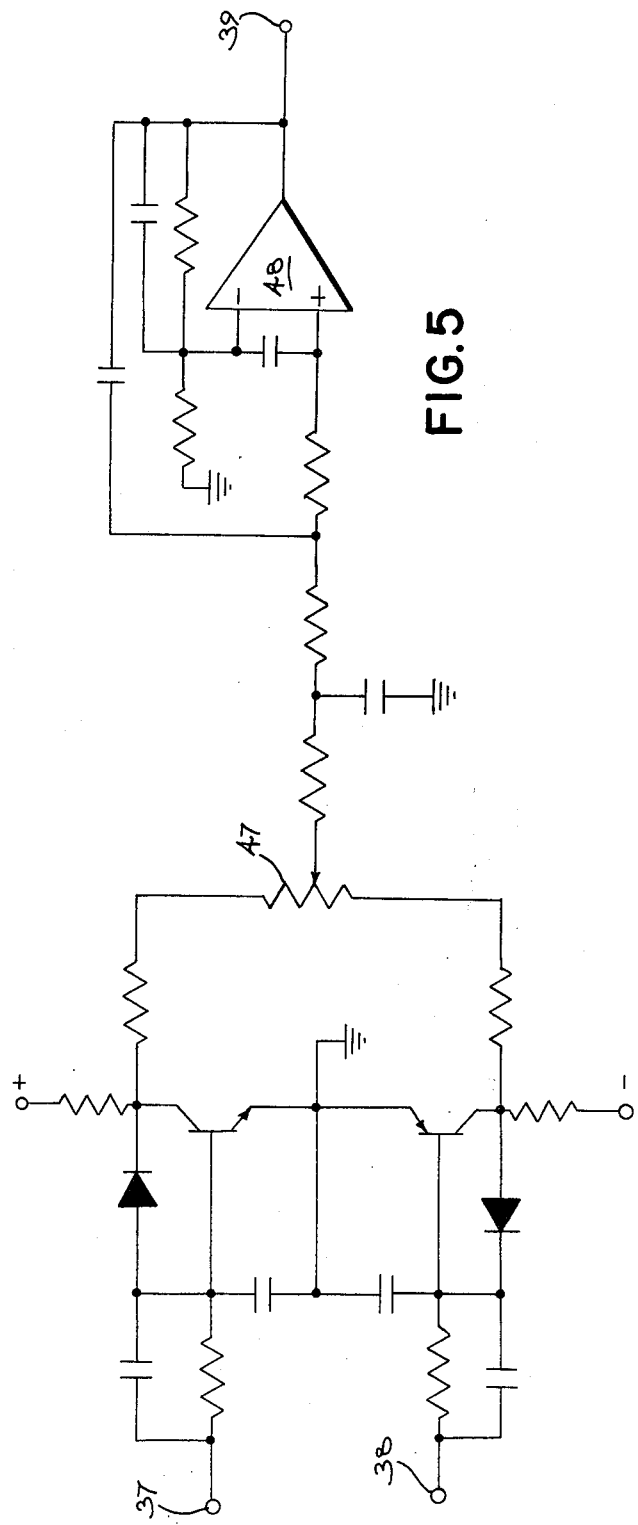
FIG. 5 is an electrical schematic diagram of a circuit which is employed as the frequency to analog converters and a phase to analog converter in the control system of FIG. 2.

Referring particularly to FIG. 5, the phase to analog converter circuit 23, the frequency to analog converter circuit 24 and the frequency to analog converter circuit 25 are essentially identical and operate in the same manner. For example, when employed as the phase to analog converter circuit 23, the circuit of FIG. 5 receives the 488 hertz rectangular wave through the line 37 and generates alternating positive and negative voltage levels at the wiper of a potentiometer 47. The average d.c. component of this alternating voltage is proportional to the duty cycle of the applied 488 hertz rectangular wave, or in the case of the frequency of analog converters 24 and 25, the average d.c. voltage is proportional to the frequency of the applied pulse train. This resulting analog signal is applied to the input of an operational amplifier 48 which is configured as a three-pole active low pass filter. A position error signal is generated at the amplifier output which connects to the line 39. Thus, when used as the phase to analog converter circuit 23, the circuit of FIG. 5 generates a positive or negative analog output signal, the magnitude of which is proportional to the duty cycle of the applied input signal. When employed as a frequency to analog converter circuit 24 or 25, the circuit of FIG. 5 generates an analog output voltage whose magnitude is proportional to the frequency of the applied pulse train and whose polarity is determined by the terminal to which the pulse train is applied.

Figure 7:
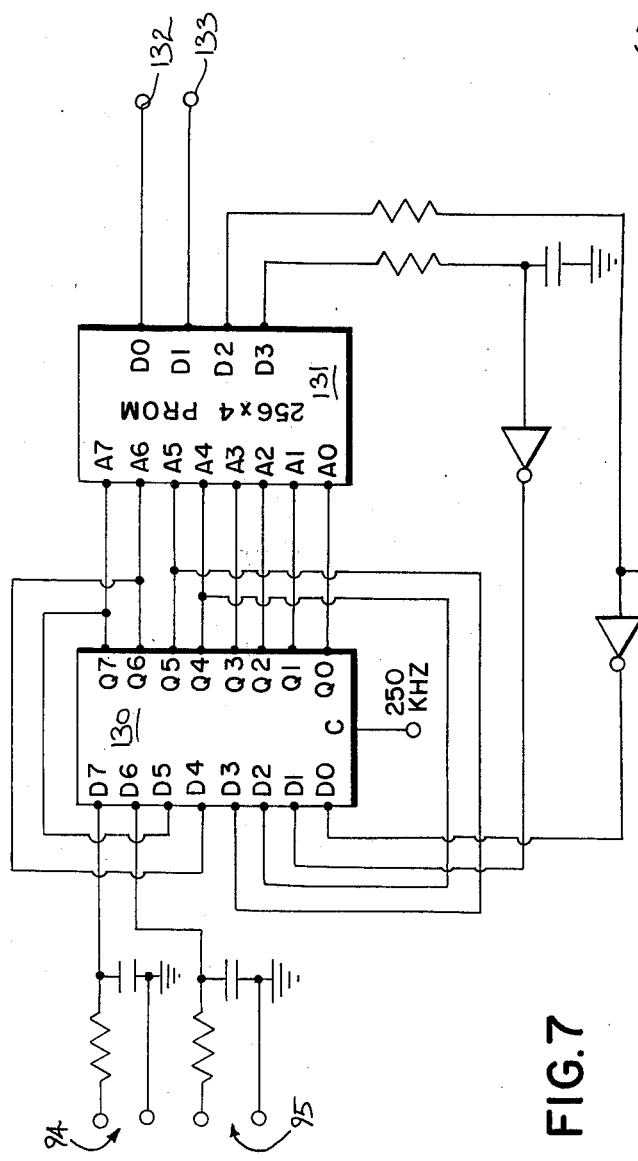
FIG. 7 is an electrical schematic diagram of the pulse generator converter circuits which form part of the control system of FIG. 2.

Referring to FIGS. 2 and 7, the pulse generator converters 26 and 27 are identical circuits. The pulse generator converter 27 for example, includes an octal latch 130 having two of its inputs connected to receive feedback pulses through lines 94 and 95 from the pulse generator 12. The latch 130 operates as a dual three-bit shift register, the outputs of which are applied to the address terminals on a 256×4 decoder PROM 131. The decoder PROM 131 determines the direction of motion and it multiplies the pulse rate by four. It outputs the resulting feedback pulse train to either a line 132 or 133 which lead to the frequency to analog converter 25.

Figure 6:
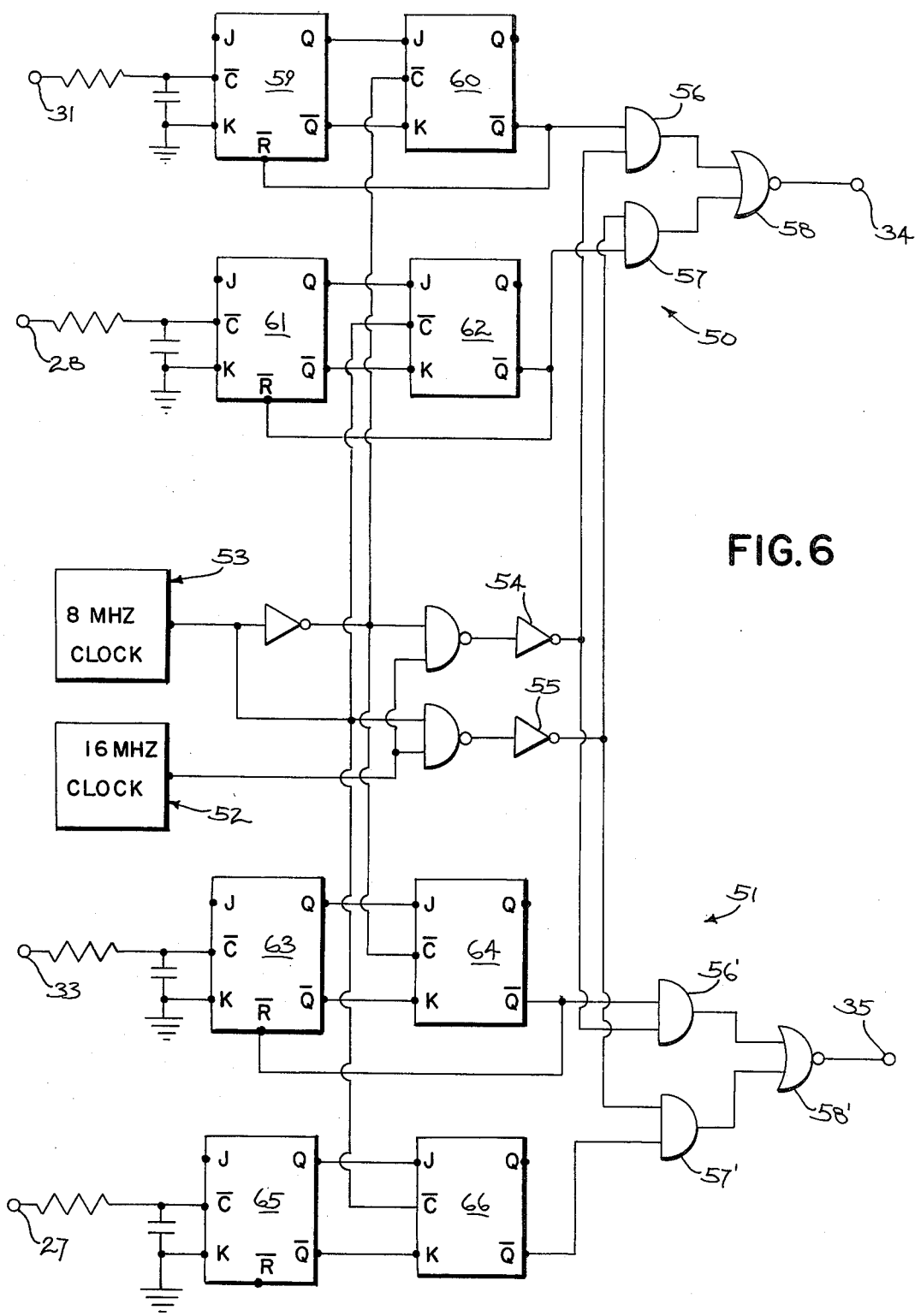
FIG. 6 is an electrical schematic diagram of the subtract synchronizer which forms part of the control system of FIG. 2.

Referring particularly to FIG. 6, the subtract synchronizer circuit 32 includes two synchronizer channels indicated generally at 50 and 51 which are driven by a 16 megahertz clock 52 and an 8 megahertz clock 53. Two 90 degree phase displaced 8 megahertz clock signals are generated by respective inverter gates 54 and 55, and these are applied to respective AND gates 56 and 57 in each synchronizer channel 50 and 51. These phase displaced clock signals are summed by an output NOR gate 58 to provide a 16 megahertz pulse train when no input pulses are applied to the subtract synchronizer 32.

Referring particularly to the synchronizer channel 50 in FIG. 6, the forward command pulse train on the line 31 is applied through a pair of flip-flops 59 and 60 to one input on the AND gate 56. For each forward position command pulse, one pulse is deleted from the 16 megahertz pulse train generated at the output of the NOR gate 58. Similarly, the retract feedback pulse train received through the line 28 is applied through a pair of flip-flops 61 and 62 to the AND gate 57. For each such retract feedback pulse, therefore, one pulse is deleted from the 16 megahertz pulse train on the line 34. The second synchronizer channel 51 operates in identical fashion. The retract command pulse train is applied through the line 33 to flip-flops 63 and 64, whereas the forward feedback signal is applied through the line 27 to flip-flops 65 and 66.

In most instances, the subtract synchronizer circuit 32 will be receiving forward command pulses at its input 31 and forward feedback pulses at its input 27 or, in the alternative, it will receive retract command pulses at its input 33 and retract feedback pulses at its input 28. The resulting pulse trains generated on the output lines 34 and 35 are applied to the phase counter 36.

Figure 8:
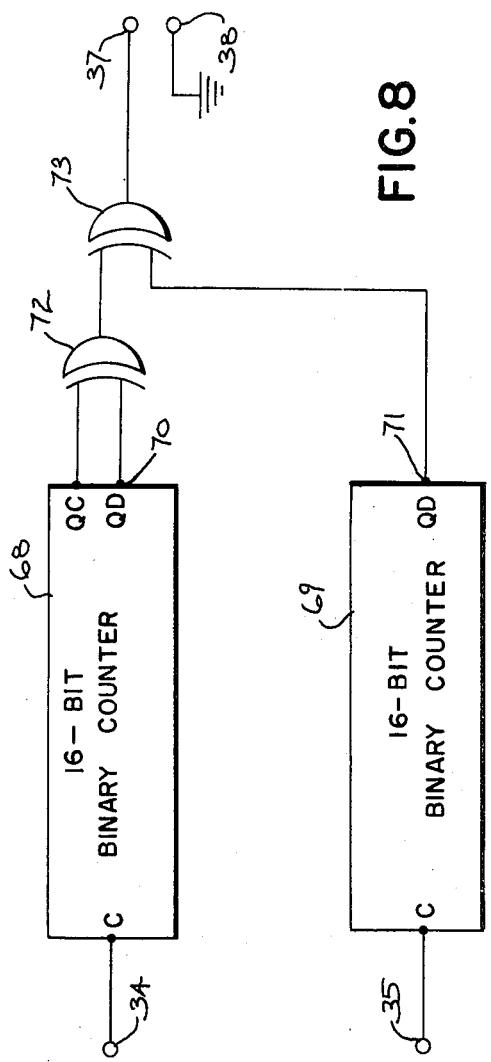
FIG. 8 is an electrical schematic diagram of the phase counter which forms part of the control system of FIG. 2.

Referring particularly to FIG. 8, the phase counter 36 includes two 16-bit binary counters 68 and 69. The two input pulse trains from the synchronizer circuit 32 serve as position command and position feedback signals to the servo drive system. The pulse train on the line 34 is applied to the clock terminal of the 16 binary counter 68 and the pulse train on the line 35 is applied to the clock terminal of the 16-bit binary counter 69. Both counters 68 and 69 are counted up by the input pulses. Each of the 16-bit counters 68 and 69 consists of four four-bit binary counters which divide the applied input pulse trains and generates a waveform at its output 70 or 71 which has a nominal frequency of 488 hertz. The phase of these output waveforms are controlled by the number of pulses deleted by the subtract synchronizer circuit 32, and the phase difference between them is proportional to the position error. The phase of the 244 hertz output signal from the counter 68 is shifted 90 degrees by an exclusive OR gate 72, and this phase shifted signal is combined with the output of the 16-bit binary counter 69 at a second exclusive OR gate 73. The output of the exclusive OR gate 73 is applied through the line 37 to the phase to analog converter circuit 23, and the position error information is embodied in the duty cycle of this 488 hertz signal.

As is well known in the art, there are numerous types of positioning control systems which receive digital command data from a control processor and precisely control the position of a movable machine member. A number of alternative positioning control systems are disclosed in U.S. Pat. Nos. 3,611,101 issued on Oct. 5, 1971; 3,548,282 issued on Dec. 15, 1970; 4,131,838 issued on Dec. 26, 1978; 4,143,310 issued on Mar. 6, 1979; 4,023,085 issued on May 10, 1977; 3,069,608 issued on Dec. 18, 1962; and 3,375,354 issued on Mar. 26, 1968.

Figure 3:
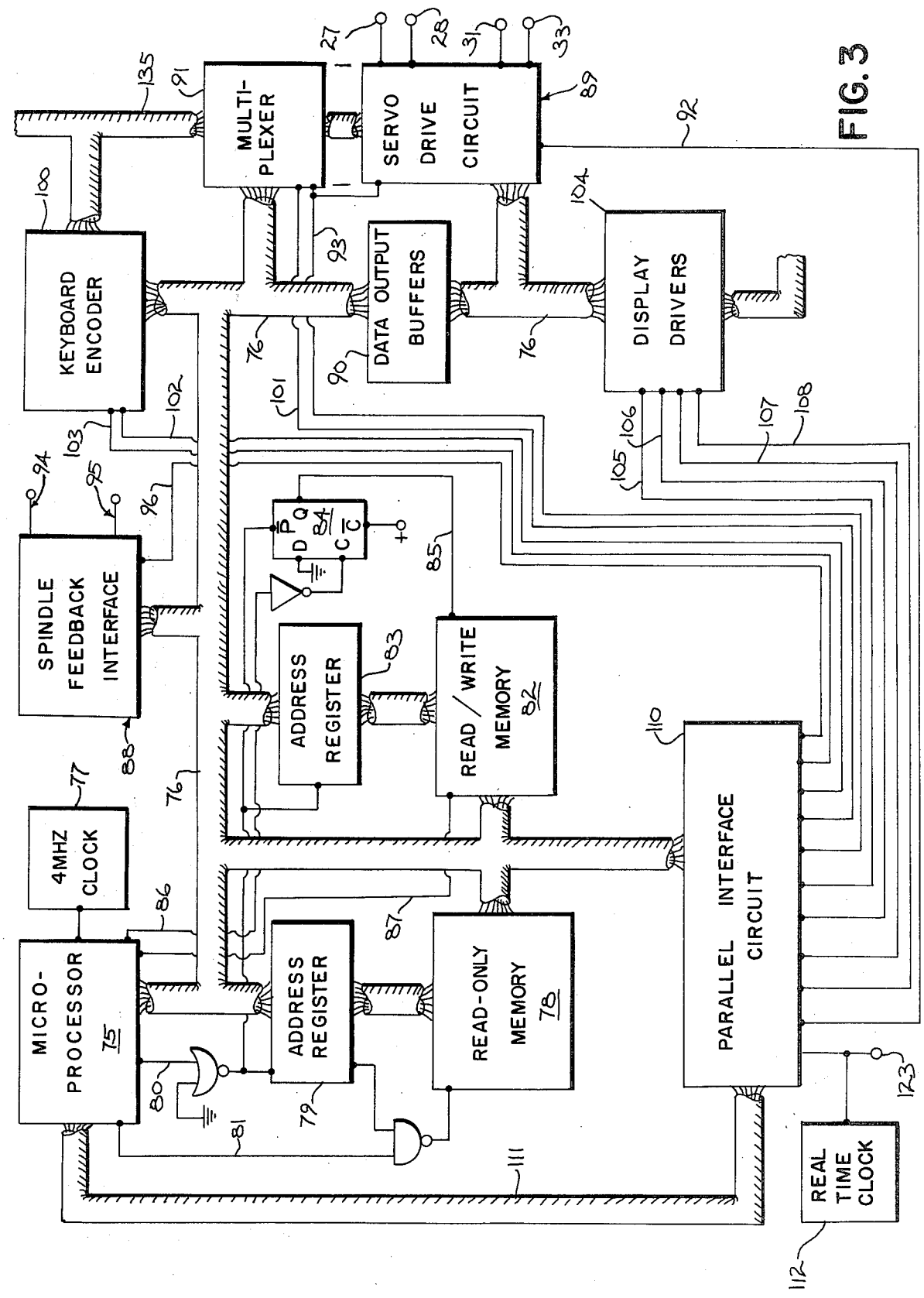
FIG. 3 is an electrical block diagram of the control processor which forms part of the control system of FIG. 2.

Referring particularly to FIG. 3, the control processor 30 which generates the command pulses to the above described position control circuit is structured around a CMOS 12-bit microprocessor 75 which is manufactured by Intersil, Inc. as part number IM6100. The microprocessor 75 is coupled to the other elements of the control processor 30 through a 12-bit bus 76 and a set of control lines. The microprocessor 75 is driven by a 4 megahertz clock 77 and it operates in response to 12-bit instructions which are stored in a read-only memory 78. Such an instruction is fetched by generating a memory address on the bus 76 which is then latched in an address register 79 when an LXMAR control line 80 becomes active. This latched address is applied to the read-only memory 78, and when a CPSEL control line 81 then becomes active, the instruction at the address in the read-only memory 78 is read out onto the bus 76 and into the instruction register of the microprocessor 75.

The data which is operated upon by the microprocessor 75 is stored in a read/write memory 82. The address terminals of the read/write memory are coupled to the bus 76 through an address register 83, and when the LXMAR control line 80 becomes active during a memory read or write operation, an address is latched in the register 83 and applied to these terminals. Simultaneously, a D-type flip-flop 84 is set by the active LXMAR control line 80 to generate a memory read state on a read/write control line 85. An XTC control line 86 also becomes active and when data is to be written to the memory 82, the flip-flop 84 is reset to generate a write signal on the control line 85. The memory 82 is enabled by a MEMSEL control line 87 and data is either read out of the memory 82 onto the bus 76 or written into the addressed memory location.

The control processor 30 is interfaced with the position control circuit through a spindle feedback interface circuit 88 and a servo drive circuit 89. Command position data is output through the bus 76 and through a set of data output buffers 90 to the servo drive circuit 89 where it is converted to a series of pulses on the line 27 or 28. Such command position output data is latched in the servo drive circuit 89 when a WRITE C1 control line 92 is active. Knife position feedback data is input through the line 31 or 33, converted to an 8-bit byte of data, and coupled through one channel of a multiplexer 91 to the bus 76. This position feedback data is selected and input to the bus 76 when a READ C1 control line 93 is active. The spindle position feedback signal is input through the lines 94 or 95, converted to a 12-bit word of data by the spindle feedback circuit 88, and read onto the bus 76 when a READ A1 control line 96 is active.

Data from the keyboard 17 and the control panel switches 19 is input through a cable 135 to a keyboard encoder 100 and to the second channel of the multiplexer 91 respectively. Eight bits of switch data is read onto the bus 76 when a READ B1 control line 101 becomes active to enable the multiplexer 91. When a keyboard key is depressed the encoder 100 sets a flag by generating a signal on a KYB control line 102. When the flag is sensed and a service routine executed, a 4-bit data word is read onto the bus 76 by activating a READ A2 control line 103.

Data is output to the control panel display 18 through the data out buffers 90 and a set of display drivers 104. The display 18 includes twelve 7-segment display devices and they are each driven with four bits of data. Data is output to them in sets of three by activating respective control lines 105–108 which connect to the drivers 104.

Referring still to FIG. 3, the control lines which activate the above-described input/output circuits are driven by a parallel interface circuit 110. The parallel interface circuit 110 is comprised of three IM6101 parallel interface elements manufactured by Intersil, Inc. These devices provide a universal means of interfacing peripheral equipment and circuits with the IM6100 microprocessor 75. The parallel interface circuit 110 is connected to the microprocessor 75 through a number of control lines, which are indicated collectively as control bus 111. The parallel interface circuit 110 is operable in response to input/output transfer instructions (IOT) generated by the microprocessor 75 to activate any one of the control lines leading to the input/output circuits. In addition, it is responsive to the signal on the KYB control line 102 to set an internal flag and it is responsive to an interrupt request signal generated by a real time clock 112 to request an interrupt from the microprocessor 75. When an interrupt is then granted, the parallel interface circuit 110 generates the vector needed to locate the proper interrupt service routine in the read-only memory 78.

The detailed operation of the microprocessor 75, and the manner in which it functions with the parallel interface circuit 110 and memories 78 and 82 is described in the Intersil, Inc. publication "Intersil IM6100 CMOS 12 Bit Microprocessor". The remaining circuitry of the control processor 30 will now be described in more detail.

Figure 9:
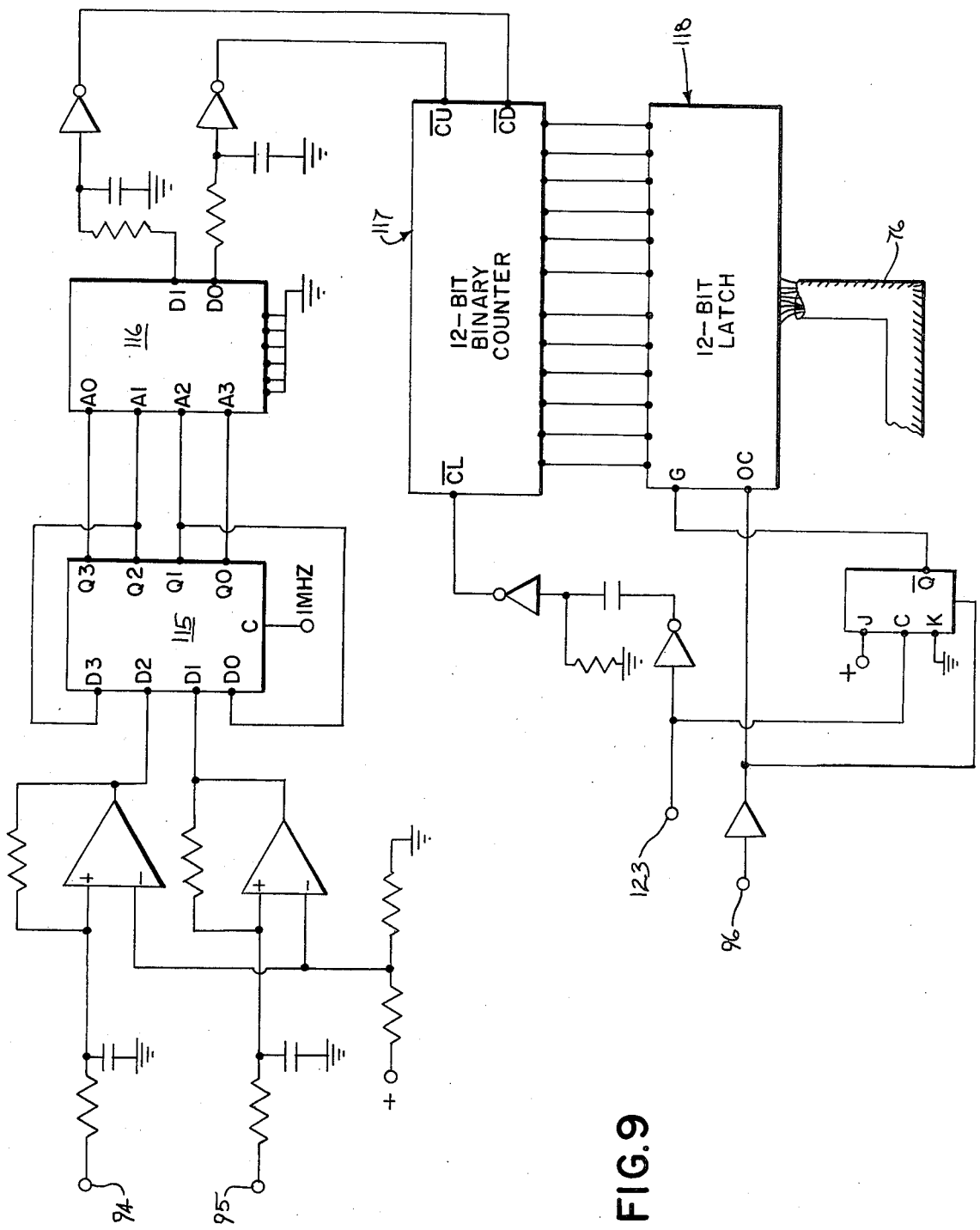
FIG. 9 is an electrical schematic diagram of the spindle feedback signal interface circuit which forms part of the control processor of FIG. 3.

Referring particularly to FIGS. 3 and 9, the spindle feedback interface circuit 88 receives either forward feedback pulse through line 94 or reverse feedback pulse through line 95. In either case, the feedback pulses are input to a set of shift register flip-flops 115 and coupled through a decoding PROM 116 to generate a pair of pulse trains which are four times the frequency of the feedback signal. This pulse train is applied to a 12-bit binary counter 117 through its count up terminal or count down terminal. Each count in the counter 117 represents a preselected incremental amount of lathe spindle rotation. This count is gated into a 12-bit gated latch 118 every 5.53 milliseconds when a clock pulse is received from the real time clock 112 through a line 123. When the READ A1 control line 96 is activated by executing an appropriate IOT instruction, the 12-bit count is read onto the processor bus 76. This count is then employed to calculate the actual, or absolute, spindle orientation at the real time clock instant.

Figure 10:
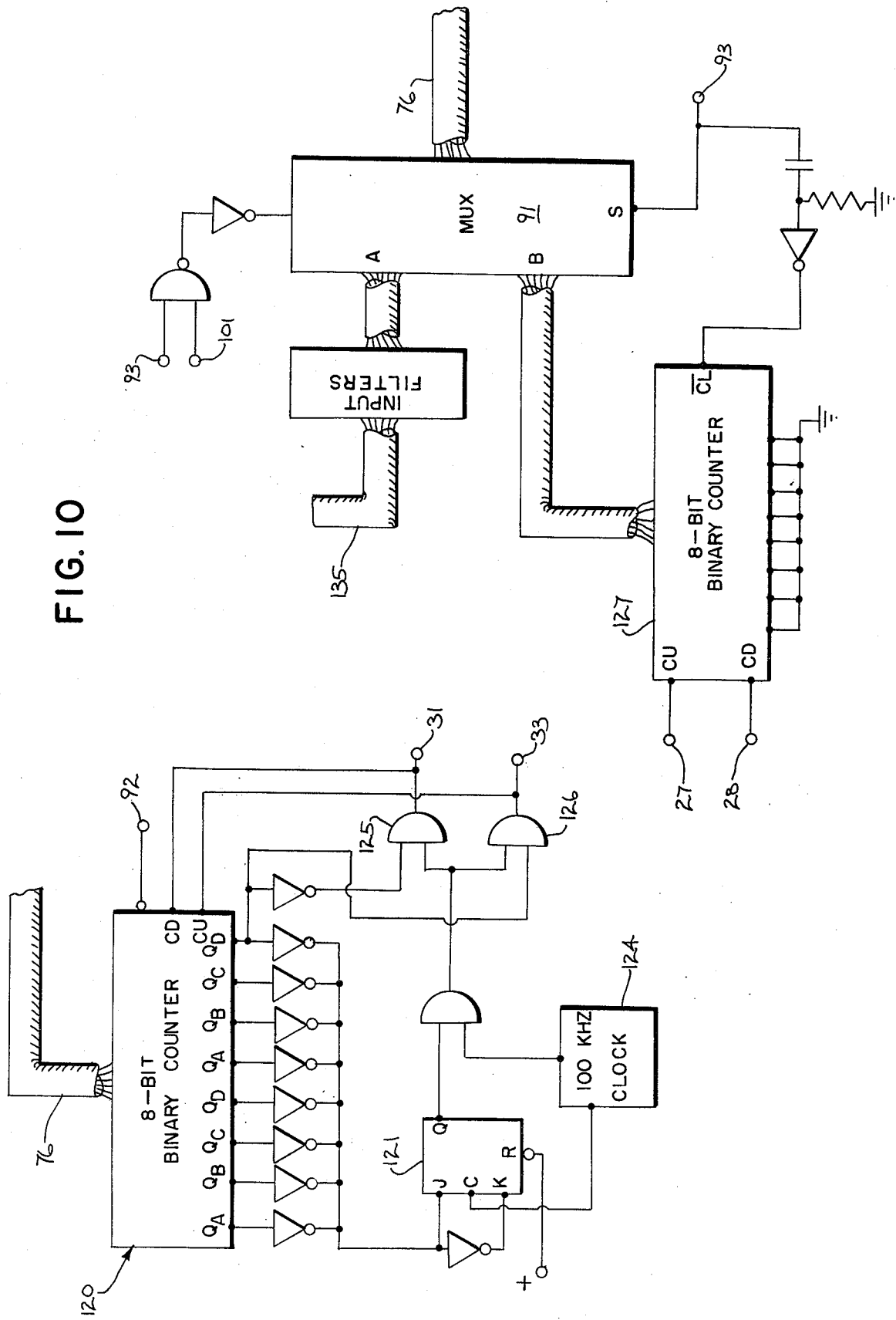
FIG. 10 is an electrical schematic diagram of the servo drive circuit and input multiplexor circuit which form part of the control processor of FIG. 3, FIGS. 11a–11d are flow charts of the programs employed by the control processor of FIG. 3, and FIGS. 12a–12c are schematic representations of the rotating log and lathe knife during a synchronous retract operation.

Referring particularly to FIGS. 3 and 10, the servo drive circuit 89 receives an eight-bit position command number from the bus 76 at the data input terminals of an 8-binary counter 120 when the WRITE C1 control line 92 is active. The outputs of the counter 120 are combined and applied to a flip-flop 121 and a sign bit output on the counter 120 is applied to AND gates 125 and 126 to establish commanded direction. A 100 kilohertz clock 124 generates a serial pulse train on one of the lines 31 or 33 that connect to the subtract synchronizer 32. The same pulse train is applied to the counter 120 and when it is counted up or down to zero, the flip-flop 121 resets to terminate the pulse train generation. The binary number loaded into the counter 120 every 5.53 milliseconds is thus converted to a corresponding serial pulse train.

Referring still to FIG. 10, the knife position feedback pulses are received through the lines 27 and 28 from the pulse generator converter 26. The forward feedback pulses are applied to the count up terminal on an 8-bit binary counter 127 and the retract feedback pulse train is applied to its count down terminal. The pulses are accumulated and the total count is periodically read out through the multiplexer 91 to the bus 76 when the READ C1 control line 93 becomes active. After a short time delay, the counter 127 is reset to zero and it continues to accumulate pulses.

Figure 11A:
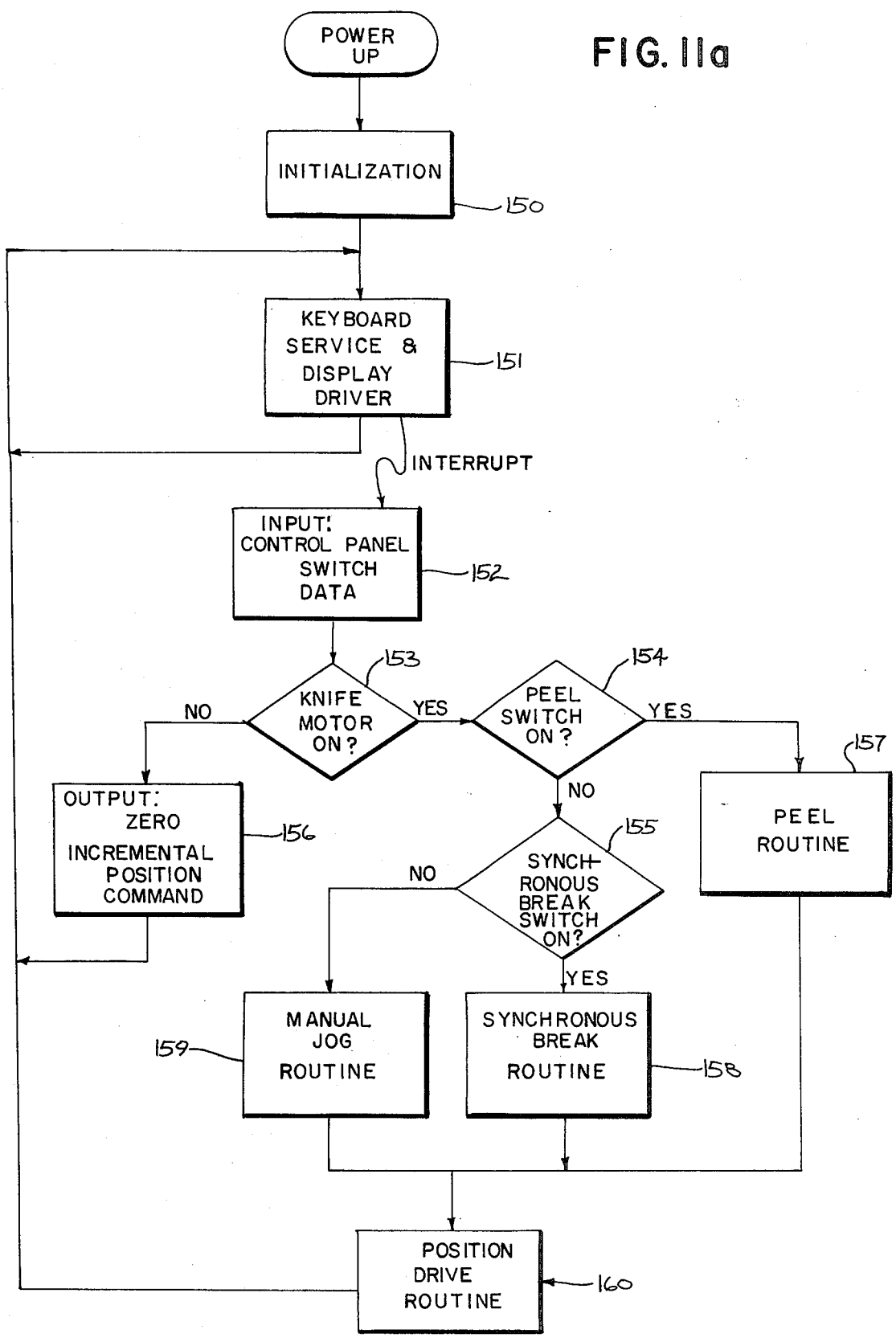
Figure 11B:
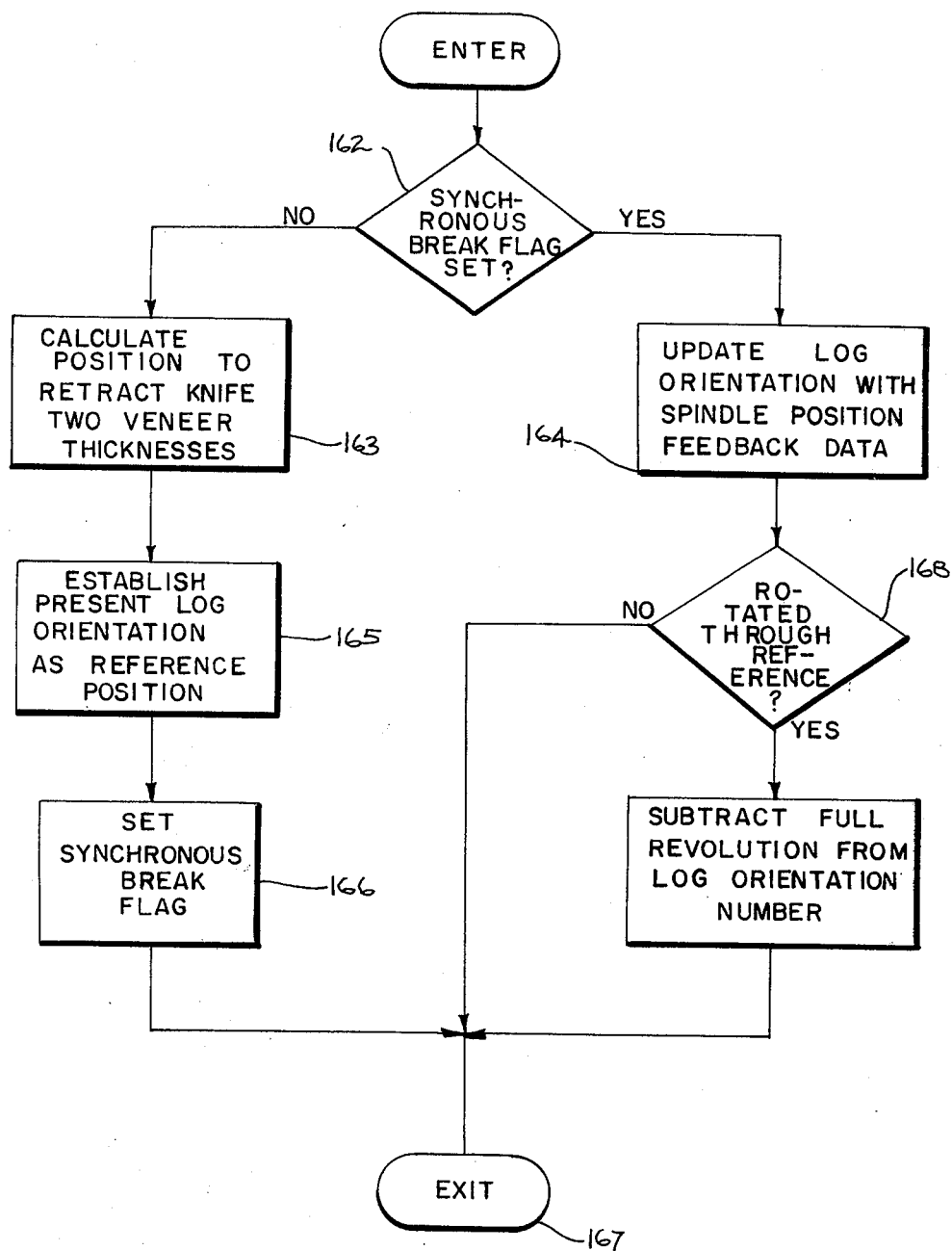
Figure 11C:
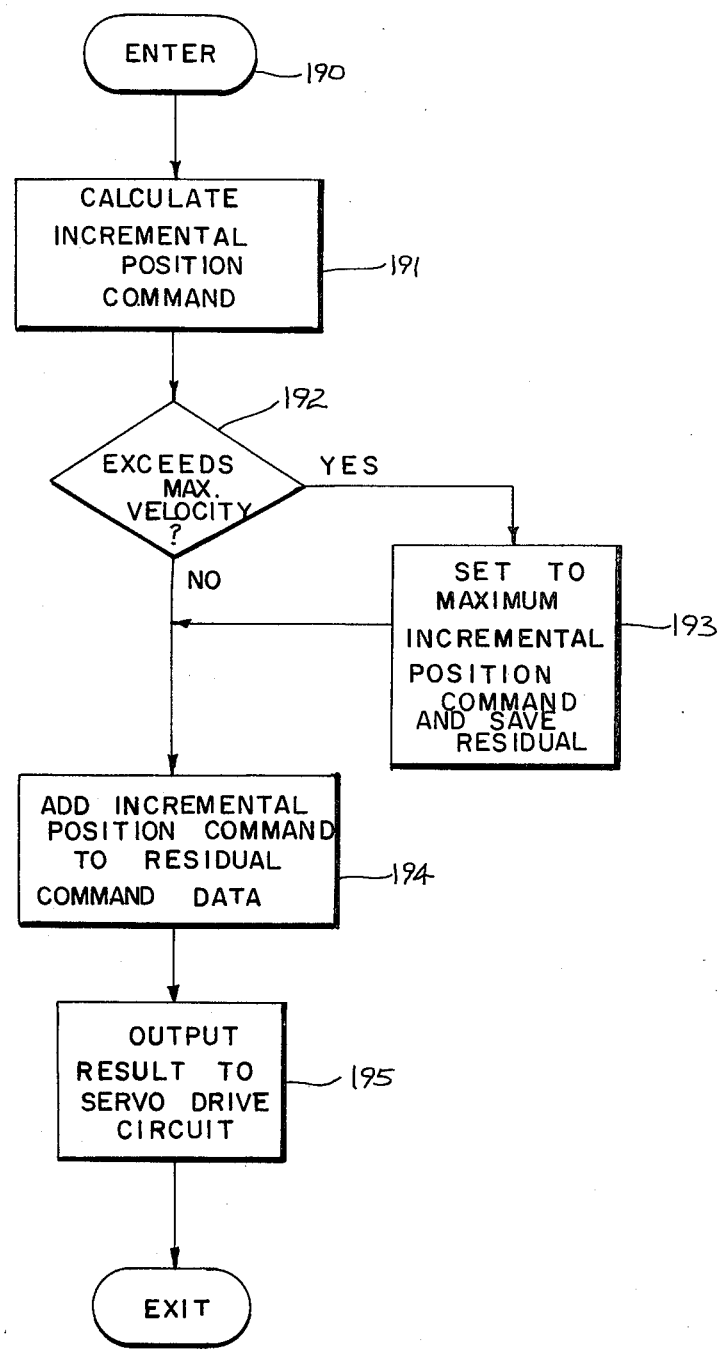

The operation of the above-described control system is determined by a program stored in the read-only memory 78. A general flow chart of this program is shown in FIG. 11a and more detailed flow charts of particular routines are shown in FIGS. 11b-d. An assembly language listing of pertinent portions of these routines are provided in Appendix A.

Referring particularly to FIG. 11a, when the system is powered up a series of instructions are executed to initialize the hardware and software as indicated by process block 150. A loop is then entered which includes a keyboard service routine and display driver routine. These are indicated collectively at process block 151. The keyboard service routine is executed each time a key is depressed and the display driver program is executed to output the contents of a display buffer to the control panel display 18. The system loops until an interrupt is generated by the real time clock 115, at which point the routines that perform the calculations needed to control lathe knife motion are entered and executed. This real time clock interrupt occurs every 5.53 milliseconds to provide virtually continuous control over the lathe knife 7 and virtually instantaneous response to changing operating conditions on the veneer lathe.

After each real time clock interrupt occurs, switch data from the control panel is input as indicated by process block 152. This switch data is analyzed as indicated by decision blocks 153, 154 and 155 to determine the mode in which the control is operating. If the knife motor is not energized as, indicated by decision block 153, an incremental position command calling for no motion is output to the servo drive circuit 89 as indicated by process block 156. The system then returns to the keyboard service and display driver 151 and awaits the next real time clock interrupt. On the other hand, if the knife motor is energized, the control panel switches are analyzed at decision block 154 to determine if the "peel" mode of operation is active. If so, a peel routine, indicated at 157 is entered and executed to calculate an absolute position to which the knife 7 should be driven over the next 5.53 milliseconds to cut veneer from the rotating log. As will be described in more detail hereinafter, this peeling operation is performed automatically to provide a continuous web of veneer having the desired thickness. The peel routine 157 operates the control processor 30 to monitor the motion of the log being rotated by the spindle motor 6 and to feed the lathe knife 7 forward at the speed necessary to peel veneer of the desired thickness. Two thicknesses may be manually entered through the keyboard 17, and either one may be selected by depressing an appropriate control panel switch 19.

When the peeling operation is not indicated by the control panel switches 19, either a synchronous retract operation or a manual job is indicated. Accordingly, the control panel switches are analyzed, as indicated by decision block 155 to determine if a synchronous retract is called for. If so, a synchronous break routine 158 is entered and executed to calculate an absolute knife position command which disengages the knife 7 from the rotating log. A major accomplishment of the present invention is that this disengagement is accomplished such that when the peel mode is again reentered, the log will be reengaged by the knife 7 at the same point at which the syncronous break is made.

If neither the peel operation or a retract operation are called for by the control panel switches 19, a jog mode of operation is presumed. A manual jog routine indicated at 159 is then entered and executed to calculate absolute knife position commands which are responsive to manual data entered by the operator at the control panel keyboard 17.

Regardless of the mode of operation, the absolute knife position command generated by either the peel routine 157, the synchronous break routine 158, or the manual jog routine 159 is converted to an incremental position command by a position drive routine indicated by the process block 160. The resulting incremental position command indicates the distance the knife 7 is to be moved in one 5.53 millisecond iteration, and it may therefore, also be viewed as a velocity signal to the position control circuitry. This incremental position command is converted to a pulse train by the servo drive circuit 89 and applied to the subtract synchronizer circuit 32 as described above. The system then loops back to the keyboard service and display driver 151 to await the next interrupt of the real time clock.

Referring particularly to FIG. 11b, when a retract operation is initiated by the operator the synchronous break routine 158 is entered and branches at a decision block 162. During the first iteration after this synchronous retract mode is selected, the system branches to a set of instructions indicated by process block 163. On the other hand, during subsequent iterations the system branches to a set of instructions indicated by process block 164. During the first iteration, an absolute knife position command number is first calculated as indicated at process block 163 to position the the knife 7 two veneer thicknesses away from the rotating log. A reference position for the rotating log is then established as indicated at process block 165. This is accomplished by setting a log orientation number to the total number of pulses which are generated by the spindle pulse generator 12 during a complete revolution of the log. A synchronous break flag is then set as indicated at process block 166 to indicate during subsequent iterations that the retract command has been generated and the log orientation has been established. The routine exists at 167 and the calculated retract command is converted to an incremental position command number which is output to the position drive circuit. This is a large incremental position command and the knife 7 will retract at its maximum allowable velocity.

During subsequent iterations, the synchronous break routine 158 is entered and branches to the right at the decision block 162. Spindle position feedback data which has been accumulated in the interface circuit 88 since the last iteration is then input and is added to the current log orientation number. The exact orientation of the log is, therefore, maintained by updating the log orientation number each iteration. The log will eventually make a complete revolution back to the established reference position and, as indicated at decision block 168, when this occurs the log orientation number is reset by subtracting from it a number equal to a full revolution of feedback pulses. The log orientation number accurately indicates at all times during the retract operation the orientation of the log with respect to the reference orientation established during the synchronous break.

Figure 12A:
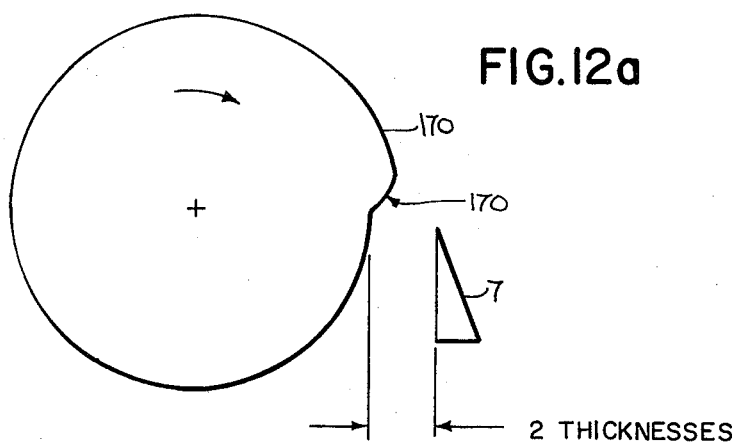

Referring particularly to FIG. 12a, the synchronous retract operation quickly moves the knife 7 two veneer thicknesses away from the rotating log 170 and produces a discontinuity 171 in the log surface at the moment of retraction. At this same moment the log orientation number is set to establish the current log orientation as the reference position. At this reference position the discontinuity 171 is aligned at the point of engagement with the knife 7. The knife 7 remains in this retracted position until the peeling mode is again entered.

Figure 12B:
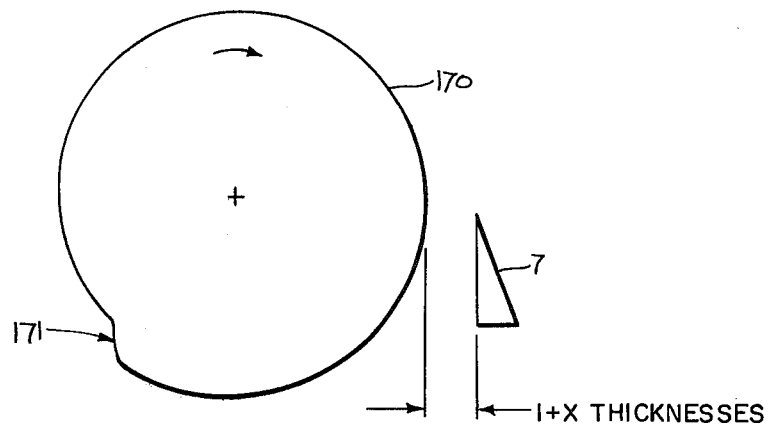
Figure 12C:
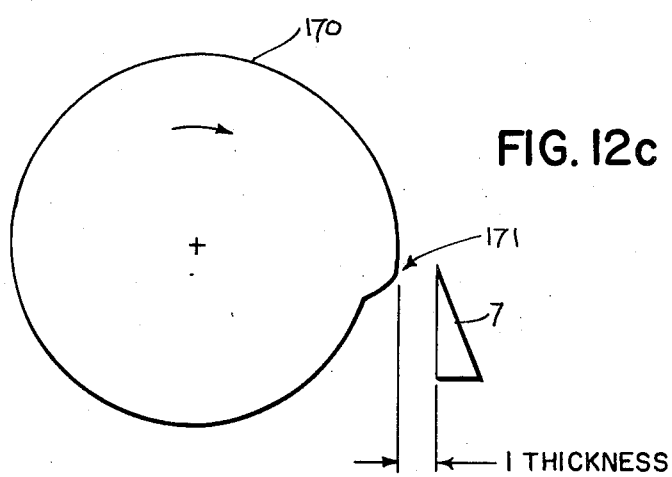

Referring particularly to FIG. 11d, when the peel mode is selected the peel routine 157 is entered at 174 and a flag is checked, as indicated at decision bock 175, to determine if a synchronous break has been previously performed. If so, the system branches to a set of instructions indicated by process block 176 which calculate a synchronization distance that will bring the knife 7 back into engagement with the log 170 at the discontinuity 171. Referring to FIGS. 12a–c, the knife 7 is two peel thicknesses from the log surface when the discontinuity is just approaching the knife 7 engagement point, and it is just one peel thickness from the log surface when the discontinuity has rotated past the engagement point. For all other log orientations, this distance is some amount between one and two peel thicknesses. This amount is a function of the log orientation and it is this amount which is calculated as the synchronization distance at process block 176. The calculation (1) command knife position=current knife position+(log position in feedback pulses)* (peel thickness)/(number of feedback pulses for complete log rotation) is indicated in equation 1.

Referring particularly to FIG. 11d, after the synchronizaation distance is calculated the synchronous break flag is reset at 177 and a peel flag is checked at decision block 178. During the first pass through the peel routine this flag is not set and the system therefore branches to set the peel flag as indicated at 179. The system then executes a set of instructions indicated at process block 181 which calculate the absolute position to which the knife 7 is to be moved during the next iteration period. These calculations are indictated in equation 2.

(2) command knife position=current knife position+(veneer thickness+compensation)*(log velocity in pulses/iteration period)/(log position feedback pulses/revolution)

During subsequent iterations the knife 7 is fed forward toward the log 170 and the peel routine 157 is repeatedly entered to calculate the absolute knife position command for the next iteration period. In addition, as indicated at process block 182 in FIG. 11d, the log orientation is updated during each iteration by inputting data from the spindle feedback interface circuit 88. Eventually, as determined at decision block 183, the log 170 will rotate to its reference orientation in which the discontinuity is aligned with the knife engagement point. The log will then rotate one more complete revolution and the knife 7 will engage the log 170 at the discontinuity 171. This engagement occurs when the log has rotated through its reference orientation twice since the peel flag was last set. As indicated at decision block 184, when this occurs the system branches to process block 185 and the initial compensation number is inserted in equation 2 at this point to compensate for mechanical varitions that occur as the knife 7 engages the rotating log 170. The compensation number is derived from manually input data and is unique to each veneer lathe. The initial value is inserted at the moment of impact and on subsequent log revolutions, the compensation number is incrementally reduced. This is accomplished by instructions indicated at process block 186 which subtract a fixed amount from the compensation number until it reaches zero. The amount subtracted is determined by the operator and is unique to each veneer lathe. The maximum compensation at impact and the rate at which this compensation is reduced to zero is thus under the control of the operator.

Referring particularly to FIGS. 11a and 11c, regardless of the mode of operation, the absolute position command generated by the jog routine 159, synchronous break routine 158 or peel routine 159 must be converted to an incremental position command at the process block 160. FIG. 11c is a detailed flow chart of the process block 160 which is entered at 190. The incremental position command is first calculated at process block 191 by subtracting the absolute position command from the previous iteration from the absolute position command for the present iteration. Before outputting this incremental position command, however, a check is made at decision block 192 to determine if it will cause excessive machine velocity. If it will, a maximum allowable incremental position command is calculated at 193 and the residual amount is saved for the next iteration. In any event, the incremental position command number is added to the residual from previous iterations at process block 194 and the result is output to the servo drive circuit at process block 195.

A veneer control system has been described which reduces the amount of waste veneer caused during the retraction and reengagement of the lathe knife. A preferred position control circuit and a preferred control processor have been described herein, but it should be apparent to those skilled in the art that the invention may be embodied in numerous other forms without deviating from the spirit of the invention.

APPENDIX A

Knife Control Routine

```
KNIFE,    TAD      FLAGS      /TEST KNIFE MOTOR ON SWITCH
          AND      K0010
          SNA CLA             /SKIP IF MOTOR ON
          JMP      MOTOFF
          TAD      FLAGS      /TEST PEEL THICKNESS 1 OR 2
          AND      K0020      /BUT NOT BOTH
          CLL RAL
          TAD      FLAGS
          AND      K0040
          SNA CLA             /SKIP IF 1 or 2; NOT BOTH
          JMP      NOPEEL
          TAD      FLAGS      /IS IT THICKNESS 1?
          AND      K0040
          SNA CLA             /SKIP IF THICKNESS 1
          JMP      TIC2
          TAD I    THK1P
          SKP
TIC2,     TAD I    THK2P
          DCA I    THICP1     /STORE PEEL THICKNESS
          JMS      PEMODP     /PROCEDURE PEEL MODE
          JMP      POSDRV     /JUMP TO POSITIONING DRIVE
          NOP
MOTROP,   MOTRON
BKVELP,   BKVEL
THK1P,    THK1PU
THK2P,    THK2PU
THICP1,   THICKN
K0377,    0377
K7400,    7400
K0200,    0200
K0010,    0010
K0020,    0020
K0040,    0040
K6000,    6000
NOPEEL,   TAD      DSCRIT     /TST PEEL & SYNCH. BREAK FLAGS
          AND      K6000
          SZA CLA             /SKIP ON NEITHER SET
          JMS      SYNBRP     /PROCEDURE SYNCHR. BREAK
          JMS      JOGMOP     /PROCEDURE JOG MODE
          JMP      POSDRV     /DO POSITIONING DRIVE
MOTOFF,   TAD      DSCRIT     /CLEAR PEEL & SYNCH. BREAK FLAGS
          AND      K6000
          DCA      DSCRIT
```

Position Drive Routine

```
POSDRV,   JMS      BDGET      /UPDATE FEEDBACK POSITION
          KNIFFP
          JMS      BDADD
          KNIFFV
          JMS      BDSTR
          KNIFFP
          CLA CLL
          TAD      FLAGS      /IS MOTOR ON
          AND      K0010
```

```
              SZA CLA                 /SKIP ON MOTOR OFF
              JMP I    MOTROP
              JMS      BDGET
              KNIFFP
              JMS      BDSTR
              KNIFCP                  /CP<-FP
              JMS      BDSTR
              KNIFRP                  /RP<-FP
              CAM
              JMS      BDSTR
              KNIFCV                  /CV<-0
              JMP      CVOUT          /OUTPUT CV
MOTRON,       JMS      BDGET          /POS.ERROR<-RP-CP
              KNIFRP                  /
              JMS      BDSUB
              KNIFCP
              JMS      BDSTR
              KNIFPE
              JMS      BDSTR          /CV<--MAXVEL<PE<MAXVEL
              KNIFCV
              SPA
              JMP      MTEST          /TEST LOW END
              JMS      BDSUB          /TEST HIGH END
              KMAXVE
              SPA
              JMP      WLIM           /PE WITHIN UPPER BOUND
              JMS      BDGET          /CV<-MAXVEL
              KMAXVE
              JMS      BDSTR
              KNIFCV
              JMP      WLIM
MTEST,        JMS      BDADD          /TEST LOW END
              KMAXVE
              SMA CLA
              JMP      WLIM           /CV WITHIN BOUNDS
              CAM
              JMS      BDSUB
              KMAXVE
              JMS      BDSTR
              KNIFCV
```

Position Drive Routine (Cont.)

```
WLIM,         JMS      BDGET          /CP<-CP+CV
              KNIFCP
              JMS      BDADD
              KNIFCV
              JMS      BDSTR
              KNIFCP
              RCRA+PIEA               /CHECK FOR REFERENCE GRANT
              AND      KA0400
              SZA CLA                 /SKIP ON REF. GRANT
              JMP CVOUT
              CAM
              JMS      BDSUB
              KNIFCP
              JMS      BDADD
              KNIFRL
              SMA
              JMP      FLMTST         /WITH IN REVERSE BOUNDS
              JMS      BDADD          /COMPUTE CV
              KNIFCV
```

```
              JMS        BDSTR
              KNIFCV
              JMS        BDGET
              KNIFRL
              JMS        BDSTR
              KNIFCP
              JMS        BDSTR
              KNIFRP
FLMTST,       JMS        BDGET        /CHECH FORWARD LIMIT
              KNIFCP
              SMA CLA
              JMP        CVOUT
              JMS        BDGET
              KNIFCV
              JMS        BDSUB
              KNIFCP
              JMS        BDSTR
              KNIFCV
              CAM
              JMS        BDSTR
              KNIFRP
              JMS        BDSTR
              KNIFCP
CVOUT,        JMS        BDGET        /OUTPUT INCREMENTAL POSITION COMMAND
              KNIFCV
              CLA MQA
              AND        KA0377
              WRITE1+PIEC
RETURN,       CLA
              TAD        FLTEMP       /RETURN TO BACKGROUND
              CLL RAR
              TAD        MQTEMP
              MQL
              TAD        ACTEMP
              ION
              JMP I      0
KA0377,       0377
```

Synchronous Break Routine

```
SYNBRK,       TAD        DSCRIT
              AND        KA2000
              SZA CLA                 /SKIP ON NOT SYNCHR. BR. BL.
              JMP        YESSYN
              TAD I      THICP3       /RP<-RP+2*THICKNESS 2
              CLL RAL
              MQL
              JMS        BDADD
              KNIFRP
              JMS        BDSTR        /STORE RP
              KNIFRP
              CLA
              TAD I      BKMRE2       /LOG POS<-
              CLL CIA                 /      -LOG PULSES/COMPLETE REV
              DCA I      BKPOS2
              TAD        KA2000       /SET SYNCHR. BR. FLAG
              MQL
              TAD        DSCRIT
              AND        KA3777       /CLEAR PEEL FLAG
              MQA
              DCA        DSCRIT
              JMP I      SYNBRP       /RETURN
```

```
YESSYN,   TAD I    BKPOS2    /NEW LOG POS<-OLD LOG POS
          TAD I    BKVEL2    /          +LOG POSITION FEEDBACK
          DCA I    BKPOS2
          TAD I    BKPOS2
          SPA CLA            /SKIP ON LOG POS>0
          JMP I    SYNBRP
          TAD I    BKMRE2    /NEW LOG POS<-OLD LOG POS
          CLL CIA            /          -LOG PULSES/COMPLETE REV
          TAD I    BKPOS2
          DCA I    BKPOS2
SYNRTS,   JMP I    SYNBRP    /RETURN
K0007,    0007
```

Peel Routine

```
PEMODE,   TAD      DSCRIT    /CHECK SYNCHR. BR. FLAG
          AND      K2000
          SNA CLA            /SKIP ON SYNCHR. BREAK
          JMP      TSTPEL    /GO TEST PEEL FLAG
          TAD I    BKMREP    /RP<-RP-
          TAD I    BKPOSP    /(LOG FEEDBACK PULSES/COMPLETE
                             /REV.+LOG POS)
          MQL                /*PEEL THICKNESS/RATIO
          JMS      BMLT      /MULTIPLY PEEL THICKNESS
          THICKN
          JMS      BDIV      /BRING NUMBER INTO RANGE
          RATIO
          DCA I    RPREM1
          SWP
          KNIFRP
          JMS      BDSTR
          KNIFRP
          CLA
          TAD      DSCRIT    /CLEAR SYNCHR. BR. FLAG
          AND      K5777
          DCA      DSCRIT
TSTPEL,   TAD      DSCRIT
          AND      KA4000
          SZA CLA            /SKIP ON NOT PEEL FLAG
          JMP      BLKUP
          TAD      KA4000
          TAD      DSCRIT
          DCA      DSCRIT
          NEG2
          DCA      LCR       /-2→LOG ROTATION COUNTER
          DCA I    OFFSEP    /φ→COMPENSATION
          TAD I    BKVEL2    /LOG POS<- -LOG VEL.
          CLL CIA
          DCA I    BKPOS2
BLKUP,    TAD I    BKPOS2    /LOG POS<- LOG POS
          TAD I    BKVEL2    /          +LOG VEL
          DCA I    BKPOS2
          TAD I    BKOFCP    /TEST LOG POS>
          CLL CIA            /LOG PULSES PER COMPENSATION CHANGE
          TAD I    BKPOS2
          SPA SNA            /SKIP ON TRUE
          JMP      REQUPD    /SKIP ON FALSE
          DCA I    BKPOS2    /LOG POS<- LOG POS-
          TAD      LCR       /IF LOG ENGAGED
          SNA CLA
```

|  |  |  |  |
|---|---|---|---|
|  | JMP | .+6 | /THEN CORRECT COMPENSATION |
|  | ISZ | LRC | /ELSE IF NOT ENGAGED |
|  | JMP | REQUPD | /THEN UPDATE POSITION |
|  | TAD I | DESOFP | /ELSE INITIAL OFFSET |
|  | DCA I | OFFSEP | /→COMPENSATION |
|  | JMP | REQUPD | /UPDATE POSITION |
|  | TAD I | CHRATP | /LOG PULSES PER COMPENSATION CHANGE |
|  | CLL CIA |  | /DECREMENT APPLIED COMPENSATION |
|  | TAD I | OFFSEP | / |
|  | DCA I | OFFSEP |  |
|  | TAD I | OFFSEP |  |
|  | SPA CLA |  | /SKIP ON COMPENSATION GREATER THAN ZERO |
|  | DCA I | OFFSEP | /CLEAR COMPENSATION NUMBER |
| REQUPD, | CLA |  |  |
|  | TAD I | THNP | /UPDATE ABSOLUTE POSITION COMMAND |
|  | TAD I | OFFSEP | /(PEEL THICKNESS+CURRENT |
|  | JMS | BDIV |  |
|  | RATIO |  |  |
|  | DCA I | RPREM2 |  |
|  | MQA |  |  |
|  | CLL RAL |  |  |
|  | CLA |  |  |
|  | SZL |  |  |
|  | CMA |  |  |
|  | SWP |  |  |
|  | CLL CIA |  | /FORM NEG OF RESULT |
|  | SWP |  |  |
|  | CMA |  |  |
|  | SZL |  |  |
|  | IAC |  |  |
|  | JMS | BDADD | /ADD RESULT TO RP |
|  | KNIFRP |  |  |
|  | JMS | BDSTR | /STORE RP |
|  | KNIFRP |  |  |
|  | CLA |  |  |
|  | JMP I | PEMODP |  |
| RPREM2, | RPREM |  |  |
| THICP3, | THK2PU |  |  |
| BKMRE2, | BKMREV |  |  |
| BKPOS2, | BKPOS |  |  |
| BKVEL2, | BKVEL |  |  |
| KA0010, | 0010 |  |  |
| KA0020, | 0020 |  |  |
| KA0200, | 0200 |  |  |
| KA0100, | 0100 |  |  |
| JOGTSP, | JOGTST |  |  |
| KA3777, | 3777 |  |  |
| KA2000, | SYNBFL |  |  |
| KA4000, | 4000 |  |  |
| OFFSEP, | OFFSET |  |  |
| BKOFCP, | BKOFCH |  |  |
| CHRATP, | CHRATE |  |  |
| THNP, | THICKN |  |  |
| DESOFP, | DESOFF |  |  |
|  | NOP |  |  |
|  | NOP |  |  |
|  | NOP |  |  |
|  | NOP |  |  |

We claim:

1. A veneer lathe control system for controlling the motion of a knife with respect to a rotating log, the combination comprising:

means coupled to the veneer lathe for sensing the orientation of the log being cut;

first manually operable switch means for selecting a retract operation;

means responsive to said first switch means for retracting the lathe knife from engagement with the rotating log;

means coupled to said retracting means and said log orientation sensing means for storing data indicative of absolute log orientation at the moment the knife disengages the rotating log during a retract operation;

second manually operable switch means for selecting a peeling operation; and means responsive to said second manually operable switch for generating position command signals that feed the lathe knife forward into engagement with the rotating log to cut veneer, said means including (a) first means for generating a position command synchronization signal for feeding the knife forward into engagement with the rotating log at substantially the same point on the log surface at which the knife was disengaged during said retract operation, and (b) second means for generating a peel position command signal for feeding the knife forward to cut veneer of a predetermined thickness.

2. The veneer lathe control system as recited in claim 1 in which said means for generating position command signals during a peeling operation further includes:

(c) third means for calculating a compensation number which accounts for lathe dynamics at the moment of knife engagement with the rotating log; and (d) fourth means coupled to said log orientation sensing means for applying said compensation number to alter said position command signal as the knife engages the rotating log.

3. The veneer lathe control system as recited in claim 2 in which said fourth means periodically decrements said applied compensation number until it reaches a value of zero.

* * * * *

UNITED STATES PATENT AND TRADEMARK OFFICE
CERTIFICATE OF CORRECTION

PATENT NO. : 4,287,462
DATED : September 1, 1981
INVENTOR(S) : Thomas L. Beck, et al It is certified that error appears in the above—identified patent and that said Letters Patent is hereby corrected as shown below:

| | |
|---|---|
| Column 2, line 4 | "of" should be -- in -- |
| Column 3, line 9 | delete "Lb" |
| Column 5, line 9 | "amplifier" should be -- amplifiers -- |
| Column 8, line 59 | "and" should be -- or -- |
| Column 9, line 56 | "job" should be -- jog -- |
| Column 10, line 40 | "the" (2nd occurrence) should be -- that -- |
| Column 11, line 27 | "is indicated in equation 1." should be on separate line. |

APPENDIX A

Column 19, PEMODE,    After "SWP" the following is missing:

```
   CLL    CIA         /FORM NEG OF RESULT
   MQL
   CMA
   SZL
   IAC
   JMS    BDADD       /UPDATE ABSOLUTE POSITION COMMAND
```

Column 21, REQUPD    after "TADI OFFSEP    /(PEEL THICKNESS + CURRENT"  -- COMPENSATION) -- is missing, plus the following:

```
   MQL
   JMS    BMLT        /*LOG FEEDBACK
   BKVEL
```

UNITED STATES PATENT AND TRADEMARK OFFICE
CERTIFICATE OF CORRECTION

PATENT NO. : 4,287,462

DATED : September 1, 1981

INVENTOR(S) : Thomas L. Beck, et al

It is certified that error appears in the above—identified patent and that said Letters Patent is hereby corrected as shown below:

Appendix B is entirely missing.

APPENDIX B

| Item | Description |
| --- | --- |
| Microprocessor 75 | CMOS 12-bit microprocessor manufactured by Intersil, Inc. as IM6100. |
| Read-Only memory 78 | |
| address register 79 | two, hex D-type flip-flop circuits manufactured by Texas Instruments, Inc. as 74LS174. |
| read/write memory 82 | |
| address register 83 | two, hex D-type flip-flop circuits manufactured by Texas Instruments, Inc. as 74LS174. |
| flip-flop 84 | Manufactured by Texas Instruments, Inc. as 74LS74. |
| data out buffers 90 | two, hex bus drivers with 3-state outputs manufactured by Texas Instruments, Inc. as 74LS367. |
| multiplexer 91 | two, quad 2-line-to-1-line multiplexers manufactured by Texas Instruments, Inc. as 74LS257. |
| display drivers 104 | |

UNITED STATES PATENT AND TRADEMARK OFFICE
CERTIFICATE OF CORRECTION

PATENT NO. : 4,287,462

DATED : September 1, 1981

INVENTOR(S) : Thomas L. Beck, et al

It is certified that error appears in the above—identified patent and that said Letters Patent is hereby corrected as shown below:

| | |
|---|---|
| parallel interface circuit 110 | three, CMOS parallel interface elements manufactured by Intersil, Inc. as IM6101. |
| operational amplifiers 41-45 and 48 | Dual monolithic operational amplifier manufactured by Fairchild Semiconductor as uA1458. |
| octal latch 130 | octal D-type flip-flop with clear manufactured by Texas Instruments, Inc. as 74LS273. |
| decoder PROM 131 | 256 by 4-bit programmable read only memory. |
| binary counters 68 and 69 | Four-bit presettable binary counters manufactured by Texas Instruments, Inc. as 74LS197. |
| flip-flops 115 | Quad D-type flip-flops with clear manufactured by Texas Instruments, Inc. as 74LS175. |
| decoder PROM 116 | 256 by 4-bit programmable read only memory. |
| binary counter 117 | Three, synchronous 4-bit counters manufactured by Texas Instruments, Inc. as 74LS193. |
| latch 118 | Two, octal D-type flip-flops with clear manufactured by Texas Instruments, Inc. as 74LS373. |

UNITED STATES PATENT AND TRADEMARK OFFICE
CERTIFICATE OF CORRECTION

PATENT NO. : 4,287,462

DATED : September 1, 1981

INVENTOR(S) : Thomas L. Beck, et al

It is certified that error appears in the above—identified patent and that said Letters Patent is hereby corrected as shown below:

| | |
|---|---|
| binary counters 120, 127 | Two, synchronous 4-bit counters manufactured by Texas Instruments, Inc. as 74LS193. |
| flip-flops 121, 125, 126 | Dual J-K flip-flops manufactured by Texas Instruments, Inc. as 74107. |

Signed and Sealed this

Sixteenth Day of February 1982

[SEAL]

Attest:

Attesting Officer

GERALD J. MOSSINGHOFF

Commissioner of Patents and Trademarks